(12) United States Patent
Damaske

(10) Patent No.: US 6,952,633 B2
(45) Date of Patent: Oct. 4, 2005

(54) DEVICE AND METHOD FOR IMPROVED MONITORING OF A LATERAL-ACCELERATION SENSOR

(75) Inventor: Joerg Damaske, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 315 days.

(21) Appl. No.: 10/274,535

(22) Filed: Oct. 16, 2002

(65) Prior Publication Data

US 2003/0120403 A1 Jun. 26, 2003

(30) Foreign Application Priority Data

Oct. 16, 2001 (DE) .......................................... 101 51 066

(51) Int. Cl.⁷ ............................. G06F 19/00; B60T 8/32
(52) U.S. Cl. ....................... 701/34; 701/76; 303/122.05
(58) Field of Search ............................. 701/34, 92, 76, 701/1, 29; 303/122.05, 122, 183, 170; 180/197

(56) References Cited

U.S. PATENT DOCUMENTS

| | | | | |
|---|---|---|---|---|
| 5,124,921 A | * | 6/1992 | Jonner et al. .................. | 701/70 |
| 6,122,577 A | * | 9/2000 | Mergenthaler et al. ....... | 701/34 |
| 6,144,904 A | * | 11/2000 | Tseng ........................... | 701/34 |
| 6,254,204 B1 | | 7/2001 | Hara et al. | |
| 6,285,933 B1 | | 9/2001 | Kohler et al. | |

FOREIGN PATENT DOCUMENTS

DE 198 44 913 4/2000
EP 0 655 376 5/1995

* cited by examiner

Primary Examiner—Gary Chin
Assistant Examiner—Ronnie Mancho
(74) Attorney, Agent, or Firm—Kenyon & Kenyon

(57) ABSTRACT

A device and a method for monitoring a lateral-acceleration sensor suitable for use in a motor vehicle. A first lateral-acceleration variable is detected which describes the lateral acceleration acting on the vehicle. The device also includes a detecting arrangement with which wheel-speed variables are detected that describe the speeds of the individual wheels. Also included is a first determination arrangement with which a variable describing the vehicle speed is determined as a function of at least one wheel-speed variable, and a second determination arrangement with which a second lateral-acceleration variable is determined as a function of at least one wheel-speed variable, as well as a monitoring arrangement in which at least one comparison of the first lateral-acceleration variable to the second lateral-acceleration variable is carried out for monitoring the lateral-acceleration sensor. In addition, an enabling arrangement is provided in which a decision is made about implementation or interruption of the monitoring in the monitoring arrangement. At least one comparison of a wheel-speed variable to the variable describing the vehicle speed is carried out in the enabling arrangement, and the monitoring of the lateral-acceleration sensor takes place depending on the result of this at least one comparison.

16 Claims, 2 Drawing Sheets

DEVICE AND METHOD FOR IMPROVED MONITORING OF A LATERAL-ACCELERATION SENSOR

FIELD OF THE INVENTION

The present invention is based on a device and a method for monitoring a lateral-acceleration sensor situated in a vehicle.

BACKGROUND INFORMATION

German Published Patent Application No. 198 44 913 discusses a device for monitoring a lateral-acceleration sensor situated in a vehicle. A first lateral-acceleration variable is detected by the lateral-acceleration sensor. The device includes processing means having at least one filtering means by which the first lateral-acceleration variable is filtered to form a filtered lateral-acceleration variable. With the aid of determination means, a second lateral-acceleration variable is determined directly as a function of wheel-speed variables that are detected by detecting means. In monitoring means, the filtered lateral-acceleration variable is compared to the second lateral-acceleration variable to monitor the lateral-acceleration sensor.

SUMMARY OF THE INVENTION

The present invention is based on a device and a method for monitoring a lateral-acceleration sensor.

The present invention may permit a plausibility check of the output signal of the lateral-acceleration sensor with the aid of an enabling function that makes it possible to check the signal of the lateral-acceleration sensor even during cornering.

According to an exemplary embodiment of the present invention, a device for monitoring a lateral-acceleration sensor, suitable for use in a motor vehicle, with which a first lateral-acceleration variable is detected that describes the lateral acceleration acting on the vehicle, includes:

- a detecting arrangement with which wheel-speed variables are detected that describe the speeds of the individual wheels,
- a first determination arrangement with which a variable describing the vehicle speed is determined as a function of at least one wheel-speed variable,
- a second determination arrangement with which a second lateral-acceleration variable is determined as a function of at least one wheel-speed variable,
- a monitoring arrangement, in which at least one comparison of the first lateral-acceleration variable to the second lateral-acceleration variable is carried out for monitoring the lateral-acceleration sensor, and
- an enabling arrangement with which a decision is made about implementing or interrupting the monitoring in the monitoring arrangement.

At least one comparison of a wheel-speed variable to the variable describing the vehicle speed may be carried out in the enabling arrangement. The lateral-acceleration sensor may be monitored depending on the result of this at least one comparison.

The enabling arrangement may provide the possibility of not monitoring the sensor in certain driving situations. Such a driving situation may exist, for example, when the second lateral-acceleration variable, ascertained in the second determination means, is faulty with a certain probability.

The comparison may depend upon whether a right curve or a left curve of the vehicle exists.

One specific exemplary embodiment is characterized in that by the comparison, it is checked:

- whether the wheel-speed variables allocated to the inside wheels assume smaller values than the variable describing the vehicle speed, and
- whether the wheel-speed variables allocated to the outside wheels assume larger values than the variable describing the vehicle speed.

The presence of a right curve or left curve is detected by evaluating the second lateral-acceleration variable. This may be achieved with no significant additional expenditure, since the second lateral-acceleration variable is available already.

The check of the lateral-acceleration sensor may be interrupted

- when, for at least one inside wheel, a wheel-speed variable is ascertained which is greater than the variable describing the vehicle speed, or
- when, for at least one outside wheel, a wheel-speed variable is ascertained which is smaller than the variable describing the vehicle speed.

These conditions may be fulfilled, for example, when large wheel-slip values occur, or when one wheel is lifted off of the roadway. In these situations, the mathematical model used for calculating the second lateral-acceleration variable may possibly have only a limited validity. Therefore, it is advantageous not to utilize the second lateral-acceleration variable for a comparison to the measured lateral acceleration in these cases.

A discontinued check of the lateral-acceleration sensor may only be commenced again when a specifiable time interval has elapsed since the moment the monitoring was interrupted. An oscillation of the enabling function is thereby avoided during straight-ahead driving.

The first lateral-acceleration variable may be filtered prior to further processing. The filter may be a low-pass filter.

The monitoring of the lateral-acceleration sensor may also be interrupted when the first lateral-acceleration variable exceeds a specifiable limiting value.

Instead of the first lateral-acceleration variable, the second lateral-acceleration variable may also be used for the query. Therefore, the monitoring of the lateral-acceleration sensor may be interrupted when the second lateral-acceleration variable exceeds a specifiable limiting value.

It is also possible to interrupt the monitoring of the lateral-acceleration sensor when the first or second lateral-acceleration variable exceeds a specifiable limiting value.

The specifiable limiting value may be selected such that when it is exceeded by the lateral-acceleration variable, this may signify a danger of lifting up for at least one wheel.

Monitoring of the lateral-acceleration sensor may also be interrupted when the road condition is detected as sand, ice or snow, or when the vehicle is in the condition of aquaplaning.

DETAILED DESCRIPTION

Figure 1:
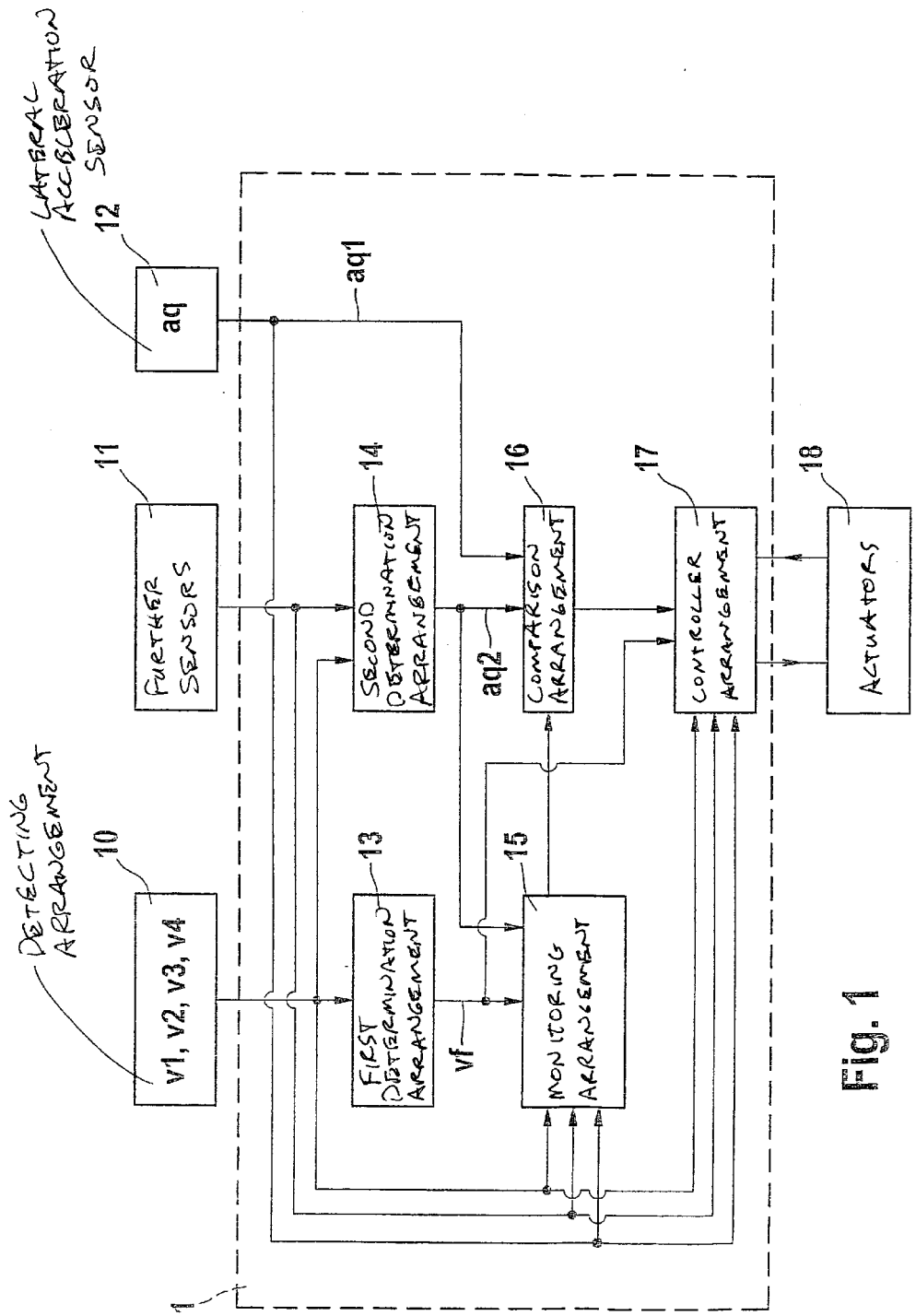
FIG. 1 shows the design of the device according to an exemplary embodiment of the present invention in the form of a block diagram.

The present invention may improve monitoring of a lateral-acceleration sensor. An exemplary design of the device is shown in FIG. 1. The input variables are supplied by blocks 10, 11 and 12. In this context, the following blocks contain the following sensors:

Block 10 contains a detecting arrangement, by which wheel-speed variables for the individual wheels are detected. In the example, a four-wheel vehicle is considered. The four wheel-speed variables v1, v2, v3 and v4 are assigned to its individual wheels. The present invention may also be applicable to vehicles having more or less than 4 wheels. To detect the wheel-speed variables, the detecting arrangement may include wheel rpm sensors with which wheel rpm variables are ascertained, as well as a conversion arrangement with which the wheel-speed variables are ascertained as a function of the wheel rpm variables. The output signals of block 10 are supplied to blocks 13, 14, 15 and 17. For example, the wheel-speed variables may be those speeds with which the wheel center points move forward.

Block 12 contains a lateral-acceleration sensor. A first lateral-acceleration variable aq1, which describes a lateral acceleration acting on the vehicle, is detected by the lateral-acceleration sensor. Lateral-acceleration variable aq1 is supplied to blocks 15, 16 and 17.

Block 11 contains further sensors. The output signals are supplied to blocks 14, 15 and 17.

The entire control unit, i.e., the controller, is represented with a broken line as block 1. For example, it may be a wheel-slip controller. This may take the form, for instance, of a vehicle dynamics controller (FDR=vehicle dynamics control, ESP=electronic stability program), anti-lock braking system (ABS) or anti-spin regulator (ASR) (traction control system (TCS)). Block 17 contains all further controller functions which are not depicted separately as blocks in FIG. 1.

In block 13, a vehicle reference speed vf is calculated from the wheel-speed variables calculated in block 10. The vehicle reference speed goes as input signal into monitoring arrangement 15, as well as into block 17. The vehicle reference speed is as exact an estimate as possible for the real speed of the vehicle center of gravity. In the following, the terms vehicle reference speed and vehicle speed are used synonymously, that is to say, it is assumed that the vehicle reference speed is exactly the real vehicle speed.

In second determination arrangement 14, an estimated lateral acceleration aq2 is calculated using a mathematical model. Used for this purpose as input signals are the wheel-speed variables, ascertained in detecting arrangement 10, and, optionally, further sensors signals (block 11). The wheel-speed variables of the nonpowered wheels may be used for this purpose.

In comparison arrangement 16, first lateral-acceleration variable aq1, ascertained in block 12, is compared to second lateral-acceleration variable aq2 ascertained in the second determination arrangement. This comparison is used for the plausibility check of the output signal of the lateral-acceleration sensor. In certain operating states, it is possible not to carry out this comparison, since a great deviation between variables aq1 and aq2 does not have to point to a defective lateral-acceleration sensor. For example, this is the case in those driving conditions in which the mathematical model used for calculating estimated lateral acceleration aq2 may have no validity.

The comparison between aq1 and aq2 in block 16 is implemented when a specifiable number of the following conditions is fulfilled in block 15:

The vehicle speed is greater than a specifiable limiting value. A value on the order of 20 kilometers/hour may be suitable.

No brake actuation is taking place.

Brake-slip control systems possibly present in the vehicle are not in the active control mode.

The difference in the rpm between the fastest and the slowest wheel is less than a specifiable value. A value on the order of 10 revolutions/minute may be suitable as the maximum permissible difference.

These conditions may also be designated as an enabling function, since checking of the output signal of the lateral-acceleration sensor is enabled by them.

According to an exemplary embodiment of the present invention, the conditions indicated above and conditions checked in block 15 are expanded by a further enabling function. This function recognizes errors on the basis of the wheel rotational speeds, and in case of an error, signals that lateral-acceleration signal aq2 estimated in block 14 is possibly incorrect. In this case, as well, a plausibility check of the lateral-acceleration sensor is not carried out, that is to say, monitoring arrangement 15 is not enabled. In this regard, from estimated lateral acceleration aq2, it is recognized whether the vehicle is in a right or left curve. The enabling function signals an error when at least the wheel speed of one inside wheel is greater than the vehicle reference speed, or when at least the wheel speed of one outside wheel is less than the vehicle reference speed. This can also be expressed mathematically. In this context, let vref be the vehicle reference speed, and:

viv=wheel-speed variable of the inside front wheel,
vih=wheel-speed variable of the inside rear wheel,
vav=wheel-speed variable of the outside front wheel,
vah=wheel-speed variable of the outside rear wheel.

An error is signaled by the enabling function when at least one of the following conditions is met:

viv>vref, or
vih>vref, or
vav<vref, or
vah<vref.

To avoid an oscillation of the enabling function during straight-ahead driving, it may only enable when a specifiable time span has elapsed since the last detected error. In practice, a value on the order of 0.1 seconds may be suitable. This functionality may be implemented from the standpoint of circuit engineering by a monostable multivibrator (=monoflop). If a lateral-acceleration value occurs that is high enough that the wheels are in danger of lifting off the roadway, then the monitoring or comparison is blocked via the enabling function, and is only enabled again after a plausible lateral acceleration has been reached. The lateral acceleration value may be measured value aq1 or ascertained value aq2. A combination of both values along the lines of an OR operation is also possible. It is likewise possible to select the lateral-acceleration value as a function of aq1 and aq2, that is, f(aq1, aq2).

Blocking via the enabling function is also important upon detection of disturbances such as aquaplaning or road conditions like snow, ice or sand, since otherwise false estimates of aq2 may be compared to sensor value aq1.

The blocking or enabling of the comparison in comparison arrangement 16 is controlled by monitoring arrangement 15. As input signals, monitoring arrangement 15 receives at least a subset of the following possible input signals:

the wheel-speed variables detected in block 10,
the further sensor signals detected in block 11, the first lateral-acceleration variable detected in block 12, the vehicle speed ascertained in block 13, and the second lateral-acceleration variable aq2 estimated in block 14.

The output signal of comparison arrangement 16 is supplied to block 17 which contains the remaining controller functions of controller 1. For example, controller 1 may be a wheel-slip controller. This may take the form, for instance, of a vehicle dynamics controller (FDR=vehicle dynamics control, ESP=electronic stability program), anti-lock braking system (ABS) or anti-spin regulator (ASR) (traction control system (TCS)). Block 17 receives input signals from blocks 10, 11, 12, 13, 16 and 18.

The output signals of block 17 trigger actuators 18. Actuators 18 may include, for example, the engine management or the wheel brakes. Starting from actuators 18, block 17 is supplied with variables or signals which indicate the state of the respective actuators and which are taken into account in the closed-loop or open-loop control.

Figure 2:
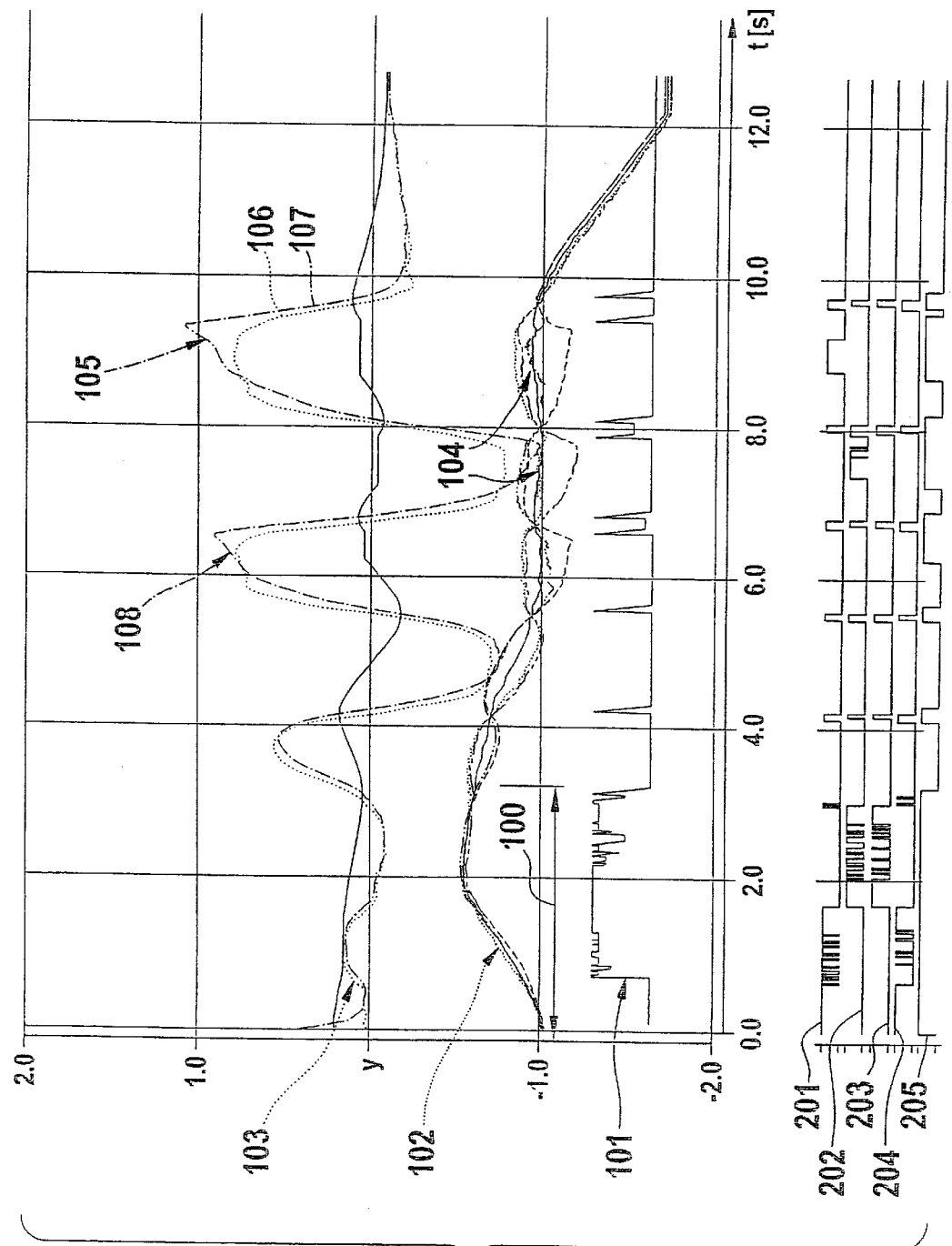
FIG. 2 shows measured signal patterns for an exemplary embodiment of the present invention.

In FIG. 2, various measured signal patterns are plotted as a function of time. The time values 0 seconds, 2 seconds, 4 seconds, . . . , 12 seconds are plotted along the time axis (=abscissa). Plotted along the y axis are normalized values which may relate to wheel speeds or to lateral accelerations. First a straight-ahead drive, and then a sinusoidal driving maneuver was driven. The time interval of the straight-ahead driving extends from time 0 to approximately time 3 seconds, and is indicated by the two-sided arrow 100.

In the upper part of the diagram, curve 105 shows the time characteristic of estimated lateral acceleration aq2. Curve 106 shows the characteristic of lateral acceleration aq1 measured by the lateral-acceleration sensor. The lower curves show the wheel speeds and the vehicle reference speed.

Curves 201, 202, 203, 204 and 205 in the lower part of FIG. 2 can only assume the binary values 0 (="low") and 1 (="high") along the ordinate. The meanings in this context are:

0: no error exists,
1: an error exists.

In the lower part of the diagram, curve 205 shows the output of the enabling function as an OR operation, which is composed of:

the individual wheel error signals 201, 202, 203 and 204, a monostable multivibrator, activated in the case of error, with 0.1 seconds delay, and a blocking threshold in the case of very high lateral accelerations.

In this context, 201 shows a detected error characteristic at the left rear wheel, 202 shows a detected error characteristic at the right rear wheel, 203 shows a detected error characteristic at the left front wheel and 204 shows a detected error characteristic at the right front wheel. The wheel-speed variable of the respective wheel was compared to the vehicle reference speed in the manner described previously.

At the beginning, the estimated lateral acceleration follows the measured sensor signal with sufficient accuracy. Since the wheels of the powered axle are in traction slip, blocking is carried out in the case of straight-ahead driving. After approximately 6 seconds (arrow 108), an overestimation occurs due to a lifting front wheel, which is masked out by the exceeding of the lateral-acceleration threshold. After approximately 7 seconds and after approximately 9 seconds, the wheel speed of the respective inside rear wheel exceeds the vehicle reference speed because of traction slip (left and right arrow 104). In addition, the lateral-acceleration threshold is exceeded. The numbered arrows not discussed have the following meanings:

101: temporal development of the states of the error time switch,
102: time characteristic of the wheel-speed variable of the right front wheel,
103: time characteristic of the measured lateral acceleration (=curve 106), and
107: time characteristic of the estimated lateral acceleration (=curve 105).

In a further specific exemplary embodiment, measured lateral acceleration aq1 is filtered prior to further processing in block 16 (FIG. 2). A low-pass filtering is considered primarily in this context. Two different things may be achieved by the filtering:

elimination of the noise in the measured quantity, and
suppression of components which may be attributable to a swaying or vibrating of the vehicle structure.

Using the exemplary embodiment of present invention described, it may be possible to check both the zero position and the offset value, respectively, of the sensor as well as the amplification factor. Moreover, the zero position and the offset value may be adapted to the laden state of the vehicle. For example, the vehicle load may have a strongly one-sided load or a roof load.

What is claimed is:

1. A device for monitoring a lateral-acceleration sensor, the lateral acceleration sensor detecting a first lateral acceleration variable that describes a lateral acceleration activity on a vehicle, the device comprising:

a detecting arrangement for detecting at least one wheel-speed variable that describes at least one speed of at least one wheel;

a first determination arrangement for determining a variable describing a vehicle speed as a first function of at least one of the at least one wheel-speed variable;

a second determination arrangement for determining a second lateral-acceleration variable as a second function of another of the at least one wheel-speed variable;

a monitoring arrangement for performing at least one first comparison of the first lateral-acceleration variable to the second lateral-acceleration variable in order to monitor the lateral-acceleration sensor; and an enabling arrangement for deciding about one of an implementation and an interruption of a monitoring performed by the monitoring arrangement, wherein:

at least one second comparison of the at least one wheel-speed variable to the variable describing the vehicle speed is performed by the enabling arrangement, and the monitoring of the lateral-acceleration sensor is performed depending on a result of the at least one second comparison.

2. The device as recited in claim 1, wherein the at least one second comparison depends upon whether one of a right curve and a left curve of the vehicle exists.

3. The device as recited in claim 2, wherein the at least one second comparison is used to check:

whether at least one inside wheel wheel-speed variable allocated to at least one inside wheel assumes a first value smaller than the variable describing the vehicle speed; and whether at least one outside wheel wheel-speed variable allocated to at least one outside wheel assumes a second value greater than the variable describing the vehicle speed.

4. The device as recited in claim 3, wherein the monitoring of the lateral-acceleration sensor is interrupted when one of the following occurs:

the at least one inside wheel wheel-speed variable assumes a third value greater than the variable describing the vehicle speed; and the at least one outside wheel wheel-speed variable assumes a fourth value smaller than the variable describing the vehicle speed.

5. The device as recited in claim 4, wherein an interrupted monitoring of the lateral-acceleration sensor is only commenced again when a specifiable time interval has elapsed since a moment the monitoring was interrupted.

6. The device as recited in claim 2, wherein a presence of one of the right curve and the left curve is detected by evaluating the second lateral-acceleration variable.

7. The device as recited in claim 1, wherein the first lateral-acceleration variable is filtered by a filter.

8. The device as recited in claim 7, wherein the filter includes a low-pass filter.

9. The device as recited in claim 1, wherein the monitoring of the lateral-acceleration sensor is interrupted when the first lateral-acceleration variable exceeds a specifiable limiting value.

10. The device as recited in claim 1, wherein the monitoring of the lateral-acceleration sensor is interrupted when the second lateral-acceleration variable exceeds a specifiable limiting value.

11. The device as recited in claim 1, wherein the monitoring of the lateral-acceleration sensor is interrupted when one of the first lateral acceleration variable and the second lateral-acceleration variable exceeds a specifiable limiting value.

12. The device as recited in claim 11, wherein the specifiable limiting value is selected so that exceeding the specifiable limiting value by one of the first lateral-acceleration variable and the second lateral-acceleration variable indicates a lifting danger for the at least one wheel.

13. The device as recited in claim 1, wherein the monitoring of the lateral-acceleration sensor is interrupted when one of the following occurs:

a road condition is detected as one of sand, ice, and snow; and the vehicle is in a state of aquaplaning.

14. The device as recited in claim 1, wherein the vehicle is a motor vehicle.

15. A method for monitoring a lateral-acceleration sensor, the lateral acceleration variable detecting a first lateral acceleration variable that describes a lateral acceleration activity on a vehicle, comprising:

detecting at least one wheel-speed variable which describes at least one speed of at least one wheel in a detecting arrangement;

determining a variable describing a vehicle speed in a first determination arrangement as a first function of the at least one wheel-speed variable;

determining a second lateral-acceleration variable in a second determination arrangement as a second function of the at least one wheel-speed variable;

performing at least one first comparison of the first lateral-acceleration variable to the second lateral-acceleration variable in a monitoring arrangement for monitoring the lateral-acceleration sensor; and performing at least one second comparison of the at least one wheel-speed variable to the variable describing the vehicle speed during cornering;

wherein the monitoring of the lateral-acceleration sensor is performed depending on a result of the at least one second comparison.

16. The method as recited in claim 15, wherein the vehicle is a motor vehicle.

* * * * *